US011171763B2

(12) United States Patent
Zhang et al.

(10) Patent No.: US 11,171,763 B2
(45) Date of Patent: Nov. 9, 2021

(54) METHOD FOR TRANSMITTING REFERENCE SIGNAL, TERMINAL AND NETWORK DEVICE

(71) Applicant: Guangdong OPPO Mobile Telecommunications Corp., Ltd., Guangdong (CN)

(72) Inventors: Zhi Zhang, Guangdong (CN); Hai Tang, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 63 days.

(21) Appl. No.: 16/608,068

(22) PCT Filed: Apr. 27, 2017

(86) PCT No.: PCT/CN2017/082239
§ 371 (c)(1),
(2) Date: Oct. 24, 2019

(87) PCT Pub. No.: WO2018/195871
PCT Pub. Date: Nov. 1, 2018

(65) Prior Publication Data
US 2020/0204334 A1 Jun. 25, 2020

(51) Int. Cl.
*H04W 76/27* (2018.01)
*H04L 5/10* (2006.01)
(Continued)

(52) U.S. Cl.
CPC .............. *H04L 5/10* (2013.01); *H04L 5/0051* (2013.01); *H04L 5/0094* (2013.01);
(Continued)

(58) Field of Classification Search
CPC . H04W 76/27; H04W 68/005; H04W 72/042; H04W 80/02; H04L 5/10; H04L 5/0051; H04L 5/0094
See application file for complete search history.

(56) References Cited

U.S. PATENT DOCUMENTS

2013/0294318 A1\* 11/2013 Amerga ................. H04W 4/06
370/312
2015/0155993 A1 6/2015 Berggren et al.
(Continued)

FOREIGN PATENT DOCUMENTS

CN 102413572 A 4/2012
CN 103944665 A 7/2014
(Continued)

OTHER PUBLICATIONS

Russian Granted Decision with Translation dated Dec. 26, 2020 X.
(Continued)

*Primary Examiner* — Wei Zhao
(74) *Attorney, Agent, or Firm* — Young Basile Hanlon & MacFarlane, P.C.

(57) ABSTRACT

A method for transmitting a reference signal, a terminal, and a network device are provided. The method includes: a terminal receives first information sent by a network device, wherein the first information is used for indicating that a transmission pattern for transmitting a demodulation reference signal (DMRS) to be transmitted is a first transmission pattern or a second transmission pattern; and the terminal performs transmission of the DMRS to be transmitted with the network device on a transmission resource indicated by the first transmission pattern or the second transmission pattern.

12 Claims, 4 Drawing Sheets

(51) Int. Cl.
  *H04L 5/00*   (2006.01)
  *H04W 68/00*  (2009.01)
  *H04W 72/04*  (2009.01)
  *H04W 80/02*  (2009.01)

(52) U.S. Cl.
  CPC ....... *H04W 68/005* (2013.01); *H04W 72/042* (2013.01); *H04W 76/27* (2018.02); *H04W 80/02* (2013.01)

(56) References Cited

U.S. PATENT DOCUMENTS

| | | | |
|---|---|---|---|
| 2015/0282123 | A1 | 10/2015 | Miao et al. |
| 2016/0087774 | A1 | 3/2016 | Guo et al. |
| 2016/0112994 | A1* | 4/2016 | Wang .................. H04W 72/042 370/329 |
| 2017/0272141 | A1* | 9/2017 | Horiuchi ............... H04L 5/0051 |

FOREIGN PATENT DOCUMENTS

| | | |
|---|---|---|
| CN | 104125186 A | 10/2014 |
| CN | 104144504 A | 11/2014 |
| CN | 106470088 A | 3/2017 |
| RU | 2609535 C2 | 11/2014 |
| WO | 2010068047 A2 | 6/2010 |
| WO | 2014110928 A1 | 7/2014 |
| WO | 2014130082 A1 | 8/2014 |
| WO | 2015148041 A1 | 10/2015 |
| WO | 2016021949 A1 | 2/2016 |
| WO | 2016068072 A1 | 5/2016 |

OTHER PUBLICATIONS

European Examination Reported dated Nov. 20, 2020.
First Chile Office Action and Translation dated Nov. 13, 2020 0.
First Canadian Office Action dated Dec. 4, 2020.
3GPP TSG RAN WG1 Meeting #88; R1-1701692 Athens, Greece, Feb. 13-17, 2017.
English translation of China Notification to Grant for CN Application 2017800504306 dated Aug. 28, 2020.
English translation of Russia Office Action for RU Application 2019136765 dated Jul. 20, 2020.
3GPP TSG RAN WG1 Meeting #88bis; R1-1704733; Spokane, USA Apr. 3-7, 2017.
3GPP TSG RAN WG1 Meeting #88bis; R1-1704234; Spokane, USA Apr. 3-7, 2017.
3GPP TSG RAN WG1 Meeting #88bis; Spokane, USA, Apr. 3-7, 2017; R1-1704233.
3GPP TSG RAN WG1 NR Ad-Hoc Meeting; Spokane, USA, Jan. 16-20, 2017; R1-1700117.
3GPP TSG RAN WG1 NR Ad-Hoc Meeting; Spokane, USA, Jan. 16-20, 2017; R1-1700135.
Extended EP Search Report for EP application 17907284.8 dated Mar. 18, 2020.
English translation of CN OA for 201780050406 dated Feb. 27, 2020.
India First Examination Report for in Application 201917047933 dated Mar. 16, 2021. (6 pages).
Singapore Written Opinion for SG Application 11201909979W dated Mar. 2, 2021. (6 pages).
Chile Second Examination Report with English Translation for CL Application 201903023 dated Feb. 9, 2021. (16 pages).
Japan Office Action with English Translation for JP Application 2019-558624 dated Mar. 26, 2021. (8 pages).
Samsung, Discussion on transmission schemes, transmission modes and control signaling, 3GPP TSG RAN WG1#86bis, R1-1609086, Oct. 10-16, 2016. (3 pages).
Vivo, On front-loaded and additional DMRS design, 3GPP TSG RAN WG1 Meeting#88, R1-1703391, Feb. 13-17, 2017. (6 pages).
Communication pursuant to Article 94(3) EPC Examination for EP Application 179072848 dated Jun. 8, 2021.
Korean Office Action with English Translation for KR Application 1020197032201 dated Jul. 8, 2021.
Canadian Second Office Action for CA Application 3061389 dated Jul. 14, 2021.
Communication pursuant to Article 94(3) EPC Examination for EP Application 17907248.8 dated Apr. 26, 2021.

\* cited by examiner

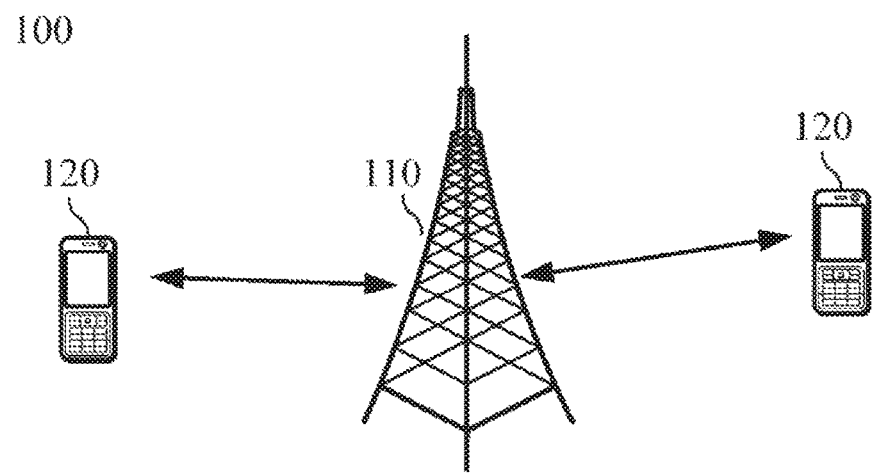

FIG. 1

A terminal receives first information sent by a network device, wherein the first information is used for indicating that a transmission pattern for transmitting a demodulation reference signal (DMRS) to be transmitted is a first transmission pattern or a second transmission pattern — 210

The terminal performs transmission of the DMRS to be transmitted with the network device on a transmission resource indicated by the first transmission pattern or the second transmission pattern — 220

FIG. 2

METHOD FOR TRANSMITTING REFERENCE SIGNAL, TERMINAL AND NETWORK DEVICE

CROSS-REFERENCE TO RELATED APPLICATION(S)

This application is a 371 application of International Application No. PCT/CN2017/082239, filed on Apr. 27, 2017, the entire disclosure of which is hereby incorporated by reference.

TECHNICAL FIELD

The present disclosure relates to the field of communication, and more particularly, to a method for transmitting a reference signal, a terminal, and a network device.

BACKGROUND

A Demodulation Reference Signal (DMRS) is a reference signal that may be used in uplink transmission and downlink transmission. In uplink transmission between a terminal and a network device, a DMRS is usually associated with transmission of a Physical Uplink Shared Channel (PUSCH) and a Physical Uplink Control Channel (PUCCH), and used for estimating an uplink channel and performing coherent detection and demodulation of the network device. In downlink transmission between a terminal and a network device, a DMRS is called user equipment specific reference signal (UE-specific RS) and used for demodulating data.

However, in an existing communication system, a location of a transmission resource for transmitting a DMRS is fixed no matter in uplink transmission or in downlink transmission. For example, in uplink transmission, a transmission resource for transmitting a DMRS is configured in a middle of one time slot. The approach of transmitting a DMRS with a fixed transmission resource is not flexible enough.

SUMMARY

The present disclosure provides a method for transmitting a reference signal, a terminal and a network device.

In a first aspect, there is provided a method for transmitting a reference signal. The method includes: a terminal receives first information sent by a network device, wherein the first information is used for indicating that a transmission pattern for transmitting a demodulation reference signal (DMRS) to be transmitted is a first transmission pattern or a second transmission pattern; and the terminal performs transmission of the DMRS to be transmitted with the network device on a transmission resource indicated by the first transmission pattern or the second transmission pattern.

In combination with the first aspect, in some implementations, the first transmission pattern is used for indicating that the DMRS to be transmitted contains an optional reference signal, and the second transmission pattern is used for indicating that the DMRS to be transmitted does not contain the optional reference signal.

In combination with the first aspect, in some implementations, a quantity of transmission resources for transmitting the DMRS to be transmitted in a transmission unit indicated by the first transmission pattern is greater than a quantity of transmission resources used for transmitting the DMRS to be transmitted in a transmission unit indicated by the second transmission pattern.

In combination with the first aspect, in some implementations, receiving, by the terminal, the first information sent by the network device, includes: the terminal receives the first information sent by the network device, wherein a first field in the first information is used for indicating that the transmission pattern for transmitting the DMRS to be transmitted is the first transmission pattern or the second transmission pattern.

In combination with the first aspect, in some implementations, receiving, by the terminal, the first information sent by the network device, includes: the terminal receives the first information sent by the network device, wherein the first information indicates whether the transmission pattern for transmitting the DMRS to be transmitted is the first transmission pattern or the second transmission pattern through whether carrying a second field or not.

In combination with the first aspect, in some implementations, the first information is at least one piece of following information: system information, a Radio Resource Control (RRC) signaling, a Media Access Control (MAC) signaling, and Downlink Control Information (DCI), and/or the first information is carried in a broadcast message transmitted through a physical layer.

In combination with the first aspect, in some implementations, the DMRS to be transmitted is used for demodulating a first channel, and the first channel is used for transmitting at least one piece of following information: a paging message and indication information, and the indication information is used for indicating contents of at least part of system information.

In a second aspect, there is provided a method for transmitting a reference signal. The method includes: a network device sends first information to a terminal, wherein the first information is used for indicating that a transmission pattern for transmitting a demodulation reference signal (DMRS) to be transmitted is a first transmission pattern or a second transmission pattern; and the network device sends the DMRS to be transmitted to the terminal on a transmission resource indicated by the first transmission pattern or the second transmission pattern.

In combination with the second aspect, in some implementations, the first transmission pattern is used for indicating that the DMRS to be transmitted contains an optional reference signal, and the second transmission pattern is used for indicating that the DMRS to be transmitted does not contain the optional reference signal.

In combination with the second aspect, in some implementations, a quantity of transmission resources for transmitting the DMRS to be transmitted in a transmission unit indicated by the first transmission pattern is greater than a quantity of transmission resources used for transmitting the DMRS to be transmitted in a transmission unit indicated by the second transmission pattern.

In combination with the second aspect, in some implementations, sending, by the network device, the first information to the terminal, includes: the network device sends the first information to the terminal, wherein a first field in the first information is used for indicating that the transmission pattern for transmitting the DMRS to be transmitted is the first transmission pattern or the second transmission pattern.

In combination with the second aspect, in some implementations, sending, by the network device, the first information to the terminal, includes: the network device sends the first information to the terminal, wherein the first information indicates whether the transmission pattern for transmitting the DMRS to be transmitted is the first transmission pattern or the second transmission pattern through whether carrying a second field or not.

In combination with the second aspect, in some implementations, the method further includes: the network device acquires communication state information of the terminal; and the network device determines the transmission pattern for transmitting the DMRS to be transmitted as the first transmission pattern or the second transmission pattern according to the communication state information.

In combination with the second aspect, in some implementations, the first information is any one piece of following information: system information, a Radio Resource Control (RRC) signaling, a Media Access Control (MAC) signaling, and Downlink Control Information (DCI), and/or the first information is carried in a broadcast message transmitted through a physical layer.

In combination with the second aspect, in some implementations, the DMRS to be transmitted is used for demodulating a first channel, and the first channel is used for transmitting at least one piece of following information: a paging message and indication information, and the indication information is used for indicating contents of at least part of system information.

In a third aspect, there is provided a terminal including units for performing the method in the first aspect.

In a fourth aspect, there is provided a network device including units for performing the method in the second aspect.

In a fifth aspect, there is provided a terminal including a memory, a processor, an input/output interface, and a communication interface. Herein, there are communication connections among the memory, the processor, the input/output interface, and the communication interface. The memory is used for storing instructions. The processor is used for executing the instructions stored in the memory. When the instructions are executed, the processor performs the method in the first aspect through the communication interface, and controls the input/output interface to receive input data and information and to output data such as an operation result.

In a sixth aspect, there is provided a network device including a memory, a processor, an input/output interface, and a communication interface. Herein, there are communication connections among the memory, the processor, the input/output interface, and the communication interface. The memory is used for storing instructions. The processor is used for executing the instructions stored in the memory. When the instructions are executed, the processor performs the method in the second aspect through the communication interface, and controls the input/output interface to receive input data and information and to output data such as an operation result.

In a seventh aspect, a computer readable medium is provided. The computer readable medium stores program codes for execution by a terminal device, and the program codes include instructions for performing the method in the first aspect.

In an eighth aspect, a computer program product including instructions is provided. When the instructions are executed on a computer, the computer program product causes the computer to perform the methods described in the various aspects.

BRIEF DESCRIPTION OF DRAWINGS

FIG. 1 shows a wireless communication system 100 applied in an implementation of the present disclosure.

FIG. 2 is a schematic flowchart of a method for transmitting a reference signal according to an implementation of the present disclosure.

DETAILED DESCRIPTION

Figure 3:
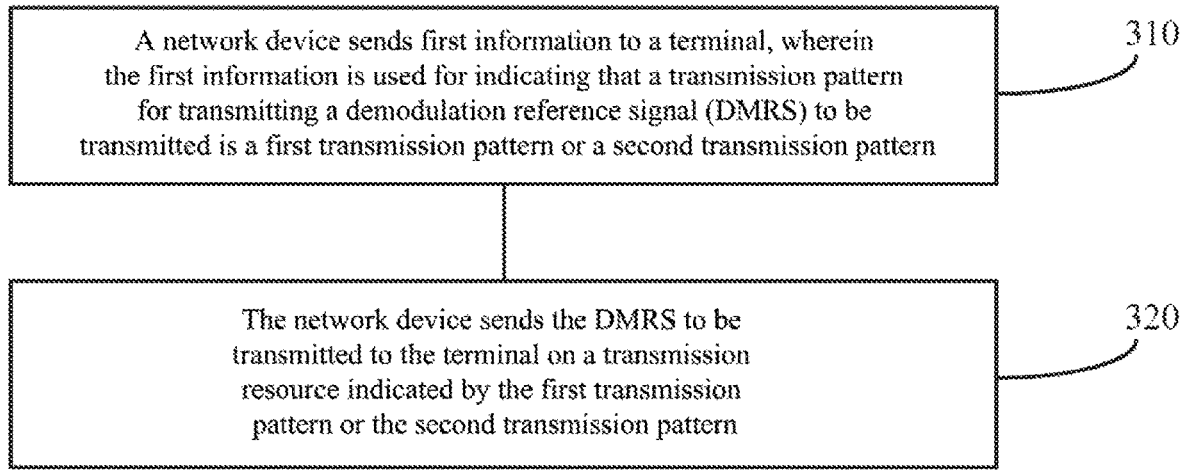
FIG. 3 is a schematic flowchart of a method for transmitting a reference signal according to another implementation of the present disclosure.

Technical solutions in the present disclosure will be described below with reference to the accompanying drawings.

FIG. 1 shows a wireless communication system 100 applied in an implementation of the present disclosure. The wireless communication system 100 may include a network device 110. The network device 110 may be a device that communicates with a terminal device. The network device 100 may provide communication coverage for a specific geographical area, and may communicate with terminal devices located within the coverage area.

FIG. 1 exemplifies one network device and two terminals. Optionally, the wireless communication system 100 may include multiple network devices, and another quantity of terminals may be included within a coverage area of each network device, which is not limited in the implementations of the present disclosure.

Optionally, the wireless communication system 100 may also include another network entity such as a network controller, a mobile management entity, and the implementations of the present disclosure are not limited thereto.

It should be understood that the technical solutions of the present disclosure may be applied to various communication systems, such as a Global System of Mobile Communication (GSM), such as a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunication System (UMTS) system, a New Radio Access Technology (NR), and 5G.

In the implementations of the present disclosure, a terminal device may include, but is not limited to, a Mobile Station (MS), a Mobile Terminal, a Mobile Telephone, a User Equipment (UE), a handset, portable equipment, and so on. The terminal device may communicate with one or more core networks via a radio access network (RAN). For example, the terminal device may be a mobile phone (or called "cellular" phone) or a computer with wireless communication function, or the like. The terminal device may be a mobile apparatus that is portable, pocket-sized, hand-held, built in a computer, or mounted on a vehicle.

In the implementations of the present disclosure, a network device may be an access network device, such as a base station, a Transmit and Receive Point (TRP), or an access point. The base station may be a Base Transceiver Station (BTS) in GSM or CDMA, a NodeB in WCDMA, an evolved Node B (eNB or e-NodeB) in LTE, or a NR or 5G base station (gNB), which is not limited in the implementations of the present disclosure.

In an existing communication system, a DMRS is transmitted on a fixed transmission resource. For a terminal with high speed mobility, not only flexibility for transmitting the DMRS is limited, but also an accuracy rate of a channel estimation result cannot be improved. For a terminal moving at a high speed, as a moving speed of the terminal increases, a velocity of channel change is also increasing. If the approach of transmitting the DMRS on the fixed transmission resource is still used for performing real-time channel estimation, an error of a channel estimation result will be larger and an accuracy rate of the channel estimation will be reduced.

To solve the problems when a DMRS is transmitted in an existing communication system, in a future communication system (e.g., 5G communication system), an optional reference signal may be further transmitted based on a mode for transmitting a DMRS in an existing communication system to improve an accuracy rate of channel estimation.

Therefore, in a future communication system, a mode for transmitting a DMRS may be generally divided into the following two types.

Transmission Mode 1: Only a DMRS of a first type is transmitted. Generally, the DMRS of the first type may effectively estimate a channel under a common scenario (e.g., a terminal located indoors or a terminal moving on a city road). When the DMRS of the first type is transmitted, the DMRS may be transmitted according to the approach of transmitting the DMRS in the existing communication system, i.e., the DMRS is transmitted on a transmission resource of an OFDM symbol in the middle of one time domain transmission unit (e.g., one time slot); or the DMRS may be transmitted in an OFDM symbol located at the front of one time domain transmission unit (e.g., one time slot) (e.g., on a first OFDM symbol in one time slot).

Transmission Mode 2: a DMRS of a first type and an optional reference signal are transmitted. To improve an accuracy rate of channel estimation under a scenario of a terminal moving at a high speed, on a basis of transmitting the DMRS of the first type, the optional reference signal (i.e., optional reference signal) is simultaneously transmitted, and the accuracy rate of channel estimation is improved through increasing a density of transmitting reference signals in a time domain transmission unit. For example, a transmission resource for transmitting the DMRS of the first type may be located in a first OFDM symbol in one time domain transmission unit (e.g., one time slot), and a transmission resource for transmitting the optional reference signal may be located in a second OFDM symbol in the time domain transmission unit.

It should be noted that the optional reference signal may be referred to as an Additional Reference Signal. The implementations of the present disclosure are not specifically limited thereto.

Hereinafter, a method for transmitting a reference signal according to an implementation of the present disclosure will be described in detail with reference to FIG. 2. FIG. 2 is a schematic flowchart of a method for transmitting a reference signal according to an implementation of the present disclosure. The method shown in FIG. 2 includes the following acts 210-220.

In act 210, a terminal receives first information sent by a network device, wherein the first information is used for indicating that a transmission pattern for transmitting a demodulation reference signal (DMRS) to be transmitted is a first transmission pattern or a second transmission pattern.

Specifically, the optional reference signal may be understood as a reference signal transmitted between the terminal and the network device, or may be a reference signal not transmitted.

It should be noted that the optional reference signal may be a DMRS.

It should be noted that the first transmission pattern and the second transmission pattern may be mutually independent transmission patterns. The first transmission pattern and the second transmission pattern are applied to different scenarios respectively, for example, the first transmission pattern may be applied to an application scenario of the transmission mode 2, for example, a DMRS is transmitted between a terminal with a high mobility and a network device, i.e., a scenario where it is difficult to perform channel estimation. The second transmission pattern may be applied to an application scenario of the transmission mode 1, for example, a terminal located indoors or a terminal moving on a city road, i.e., a scenario where it is less difficult to perform channel estimation.

Optionally, the first transmission pattern is used for indicating that the DMRS to be transmitted contains an optional reference signal, and the second transmission pattern is used for indicating that the DMRS to be transmitted does not contain the optional reference signal.

Specifically, the first transmission pattern may be a transmission pattern into which a transmission resource for transmitting an optional reference signal is added based on the second transmission pattern, that is, the transmission resource for transmitting the optional reference signal is added into the first transmission pattern based on the second transmission pattern.

Different transmission patterns (the first transmission pattern and second transmission pattern) are used for indicating whether to transmit an optional reference signal, and different transmission modes are configured to transmit a DMRS, to maintain a balance of improving accuracy of channel estimation and saving overhead for transmitting the DMRS.

Optionally, a quantity of transmission resources for transmitting the DMRS to be transmitted in a transmission unit indicated by the first transmission pattern is greater than a quantity of transmission resources for transmitting the DMRS to be transmitted in a transmission unit indicated by the second transmission pattern. Alternatively, a density of transmission resources for transmitting the DMRS to be transmitted in the transmission unit indicated by the first transmission pattern is greater than a density of transmission resources for transmitting the DMRS to be transmitted in the transmission unit indicated by the second transmission pattern.

Optionally, the network device may determine whether the transmission pattern for transmitting the DMRS to be transmitted is the first transmission pattern or the second transmission pattern according to communication state information of the terminal, that is, the network device may determine whether the DMRS to be transmitted contains an optional reference signal according to the communication state information of the terminal.

Optionally, the communication state information may be information affecting quality of communication between the terminal and the network device, for example, the communication state information may be a moving speed of the terminal, location information of the terminal, etc.

In act 220, the terminal performs transmission of the DMRS to be transmitted with the network device on a transmission resource indicated by the first transmission pattern or the second transmission pattern.

Specifically, the act 220 may include: the terminal sends the DMRS to be transmitted to the network device on the transmission resource indicated by the first transmission pattern or the second transmission pattern, that is, the DMRS to be transmitted is a reference signal for uplink transmission.

The act 220 may further include: the terminal receives the DMRS to be transmitted sent by the network device on the transmission resource indicated by the first transmission pattern or the second transmission pattern, that is, the DMRS to be transmitted is a reference signal for downlink transmission.

The first information indicates a transmission pattern of the DMRS to be transmitted, thereby avoiding that the DMRS can be transmitted on only a fixed resource in the existing art, and being beneficial to improving the flexibility for transmitting a DMRS.

Optionally, as one implementation, receiving, by the terminal, the first information sent by the network device, includes: the terminal receives the first information sent by the network device, wherein a first field in the first information is used for indicating that the transmission pattern for transmitting the DMRS to be transmitted is the first transmission pattern or the second transmission pattern.

Specifically, the first information may indicate that the transmission pattern for transmitting the DMRS to be transmitted is the first transmission pattern or the second transmission pattern through a value of the first field.

For example, the first field is 1 bit. When a value of the first field is 1, it may be used for indicating that the transmission pattern for transmitting the DMRS to be transmitted is the first transmission pattern. When the value of the first field is 0, it may be used for indicating that the transmission pattern for transmitting the DMRS to be transmitted is the second transmission pattern.

For another example, the first field is 1 bit. When a value of the first field is 0, it may be used for indicating that the transmission pattern for transmitting the DMRS to be transmitted is the first transmission pattern. When the value of the first field is 1, it may be used for indicating that the transmission pattern for transmitting the DMRS to be transmitted is the second transmission pattern.

Optionally, as one implementation, receiving, by the terminal, the first information sent by the network device, includes: the terminal receives the first information sent by the network device, wherein the first information indicates whether the transmission pattern for transmitting the DMRS to be transmitted is the first transmission pattern or the second transmission pattern through whether carrying a second field or not.

Specifically, the second field may be an optional field in the first information, and the first information may indicate whether the transmission pattern for transmitting the DMRS to be transmitted is the first transmission pattern or the second transmission pattern through whether carrying the optional field.

For example, first information carrying the second field may be used for indicating that the transmission pattern for transmitting the DMRS to be transmitted is the first transmission pattern, and first information not carrying the second field may be used for indicating that the transmission pattern for transmitting the DMRS to be transmitted is the second transmission pattern.

For another example, first information not carrying the second field may be used for indicating that the transmission pattern for transmitting the DMRS to be transmitted is the first transmission pattern, and first information carrying the second field may be used for indicating that the transmission pattern for transmitting the DMRS to be transmitted is the second transmission pattern.

Optionally, as one implementation, the first information is any one piece of following information: system information, a Radio Resource Control (RRC) signaling, a Media Access Control (MAC) signaling, and Downlink Control Information (DCI), and/or the first information is carried in a broadcast message transmitted through a physical layer.

It should be noted that when first information is system information, a transmission pattern for transmitting a DMRS indicated by the first information may be used for indicating a transmission pattern for transmitting a DMRS after the first information.

When first information is a RRC signaling, a MAC signaling, or DCI, a terminal needs to access a network before starting up and registering, and then the terminal may switch to an idle state to receive a paging message. Therefore, the information may be used for indicating to transmit a transmission pattern used for a DMRS while transmitting the paging message.

Optionally, the system information may be at least one piece of system information necessary for a terminal to access a network (remaining minimum system information).

It should be understood that the first information may be information in a future communication system having the same function as the system information, for example, it may be information for accessing a cell: cell selection information, frequency bandwidth indication, a system information modification tag, etc. Optionally, it may be access restriction information: public radio resource configuration, frequency information, a time length for controlling a terminal in uplink clock synchronization, etc. Optionally, it may be reselection information of a public cell, etc. The implementations of the present disclosure are not specifically limited thereto.

Optionally, as one implementation, the DMRS to be transmitted is used for demodulating a first channel, and the first channel is used for transmitting at least one piece of: a paging message and indication information, and the indication information is used for indicating contents of at least part of system information.

Specifically, the indication information is used for indicating contents of at least part of the system information, that is, the indication information may be information in a future communication system having the same function as the system information, for example, information having the same function as a system information block 1 (SIB1) for assisting the terminal to access the network device.

FIG. 3 is a schematic flowchart of a method for transmitting a reference signal according to another implementation of the present disclosure. The method shown in FIG. 3 includes acts 310 and 320.

In act 310, a network device sends first information to a terminal, wherein the first information is used for indicating that a transmission pattern for transmitting a demodulation reference signal (DMRS) to be transmitted is a first transmission pattern or a second transmission pattern.

In act 320, the network device sends the DMRS to be transmitted to the terminal on a transmission resource indicated by the first transmission pattern or the second transmission pattern.

Optionally, as one implementation, the first transmission pattern is used for indicating that the DMRS to be transmitted contains an optional reference signal, and the second transmission pattern is used for indicating that the DMRS to be transmitted does not contain the optional reference signal.

Optionally, as one implementation, a quantity of transmission resources for transmitting the DMRS to be transmitted in a transmission unit indicated by the first transmission pattern is greater than a quantity of transmission resources used for transmitting the DMRS to be transmitted in a transmission unit indicated by the second transmission pattern.

Optionally, as one implementation, sending, by the network device, the first information to the terminal, includes: the network device sends the first information to the terminal, wherein a first field in the first information is used for indicating that the transmission pattern for transmitting the DMRS to be transmitted is the first transmission pattern or the second transmission pattern.

Optionally, as one implementation, sending, by the network device, the first information to the terminal, includes: the network device sends the first information to the terminal, wherein the first information indicates whether the transmission pattern for transmitting the DMRS to be transmitted is the first transmission pattern or the second transmission pattern through whether carrying a second field or not.

Optionally, as one implementation, the method further includes: the network device acquires communication state information of the terminal; and the network device determines whether the DMRS to be transmitted contains the optional reference signal according to the communication state information.

Optionally, as one implementation, the DMRS to be transmitted is used for demodulating a first channel, and the first channel is used for transmitting at least one piece of following information: a paging message and indication information, and the indication information is used for indicating contents of at least part of system information.

The methods for transmitting the reference signal of the implementations in the present disclosure have been described in detail with reference to FIGS. 1 to 3. The apparatuses of the implementations in the present disclosure will be described in detail below with reference to FIGS. 4 to 7. It should be understood that the apparatuses shown in FIGS. 4 to 7 can realize the various acts in FIG. 2, and the various acts will not be described in detail to avoid repetition.

Figure 4:
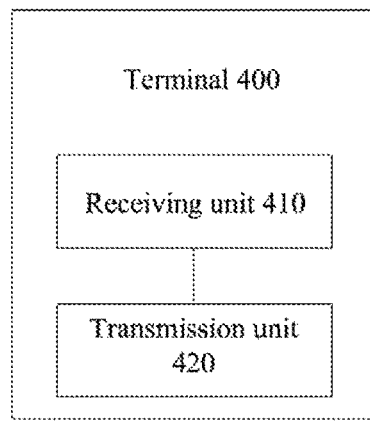
FIG. 4 is a schematic structural diagram of a terminal according to an implementation of the present disclosure.

FIG. 4 is a schematic structural diagram of a terminal according to an implementation of the present disclosure. The terminal 400 shown in FIG. 4 includes a receiving unit 410 and a transmission unit 420.

The receiving unit 410 is used for receiving first information sent by a network device, wherein the first information is used for indicating that a transmission pattern for transmitting a demodulation reference signal (DMRS) to be transmitted is a first transmission pattern or a second transmission pattern.

The transmission unit 420 is used for performing transmission of the DMRS to be transmitted with the network device on a transmission resource indicated by the first transmission pattern or the second transmission pattern.

Optionally, as one implementation, the first transmission pattern is used for indicating that the DMRS to be transmitted contains an optional reference signal, and the second transmission pattern is used for indicating that the DMRS to be transmitted does not contain the optional reference signal.

Optionally, as one implementation, a quantity of transmission resources for transmitting the DMRS to be transmitted in a transmission unit indicated by the first transmission pattern is greater than a quantity of transmission resources used for transmitting the DMRS to be transmitted in a transmission unit indicated by the second transmission pattern.

Optionally, as one implementation, the receiving unit is specifically used for receiving the first information sent by the network device, wherein a first field in the first information is used for indicating that the transmission pattern for transmitting the DMRS to be transmitted is the first transmission pattern or the second transmission pattern.

Optionally, as one implementation, the receiving unit is specifically used for receiving the first information sent by the network device, wherein the first information indicates whether the transmission pattern for transmitting the DMRS to be transmitted is the first transmission pattern or the second transmission pattern through whether carrying a second field or not.

Optionally, as one implementation, the first information is any one piece of following information: system information, a Radio Resource Control (RRC) signaling, a Media Access Control (MAC) signaling, and Downlink Control Information (DCI), and/or the first information is carried in a broadcast message transmitted through a physical layer.

Optionally, as one implementation, the DMRS to be transmitted is used for demodulating a first channel, and the first channel is used for transmitting at least one piece of following information: a paging message and indication information, and the indication information is used for indicating contents of at least part of system information.

Figure 5:
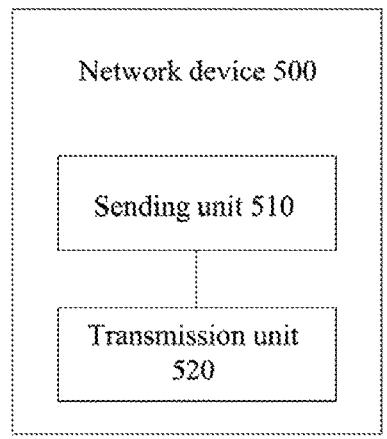
FIG. 5 is a schematic structural diagram of a network device according to an implementation of the present disclosure.

FIG. 5 is a schematic structural diagram of a network device according to an implementation of the present disclosure. The network device 500 shown in FIG. 5 includes a sending unit 510 and a transmission unit 520.

The sending unit 510 is used for sending first information to a terminal, wherein the first information is used for indicating that a transmission pattern for transmitting a demodulation reference signal (DMRS) to be transmitted is a first transmission pattern or a second transmission pattern.

The transmission unit 520 is used for transmitting the DMRS to be transmitted to the terminal on a transmission resource indicated by the first transmission pattern or the second transmission pattern.

Optionally, as one implementation, the first transmission pattern is used for indicating that the DMRS to be transmitted contains an optional reference signal, and the second transmission pattern is used for indicating that the DMRS to be transmitted does not contain the optional reference signal.

Optionally, as one implementation, a quantity of transmission resources for transmitting the DMRS to be transmitted in a transmission unit indicated by the first transmission pattern is greater than a quantity of transmission resources used for transmitting the DMRS to be transmitted in a transmission unit indicated by the second transmission pattern.

Optionally, as one implementation, the sending unit is specifically used for sending the first information to the terminal, wherein a first field in the first information is used for indicating that the transmission pattern for transmitting the DMRS to be transmitted is the first transmission pattern or the second transmission pattern.

Optionally, as one implementation, the sending unit is specifically used for sending the first information to the terminal, wherein the first information indicates whether the transmission pattern for transmitting the DMRS to be transmitted is the first transmission pattern or the second transmission pattern through whether carrying a second field or not.

Optionally, as one implementation, the network device further includes an acquisition unit used for acquiring communication state information of the terminal; a determining unit used for determining the transmission pattern for transmitting the DMRS to be transmitted as the first transmission pattern or the second transmission pattern according to the communication state information.

Optionally, as one implementation, the first information is any one piece of following information: system information, a Radio Resource Control (RRC) signaling, a Media Access Control (MAC) signaling, and Downlink Control Information (DCI), and/or the first information is carried in a broadcast message transmitted through a physical layer.

Optionally, as one implementation, the DMRS to be transmitted is used for demodulating a first channel, and the first channel is used for transmitting at least one piece of following information: a paging message and indication information, and the indication information is used for indicating contents of at least part of system information.

Figure 6:
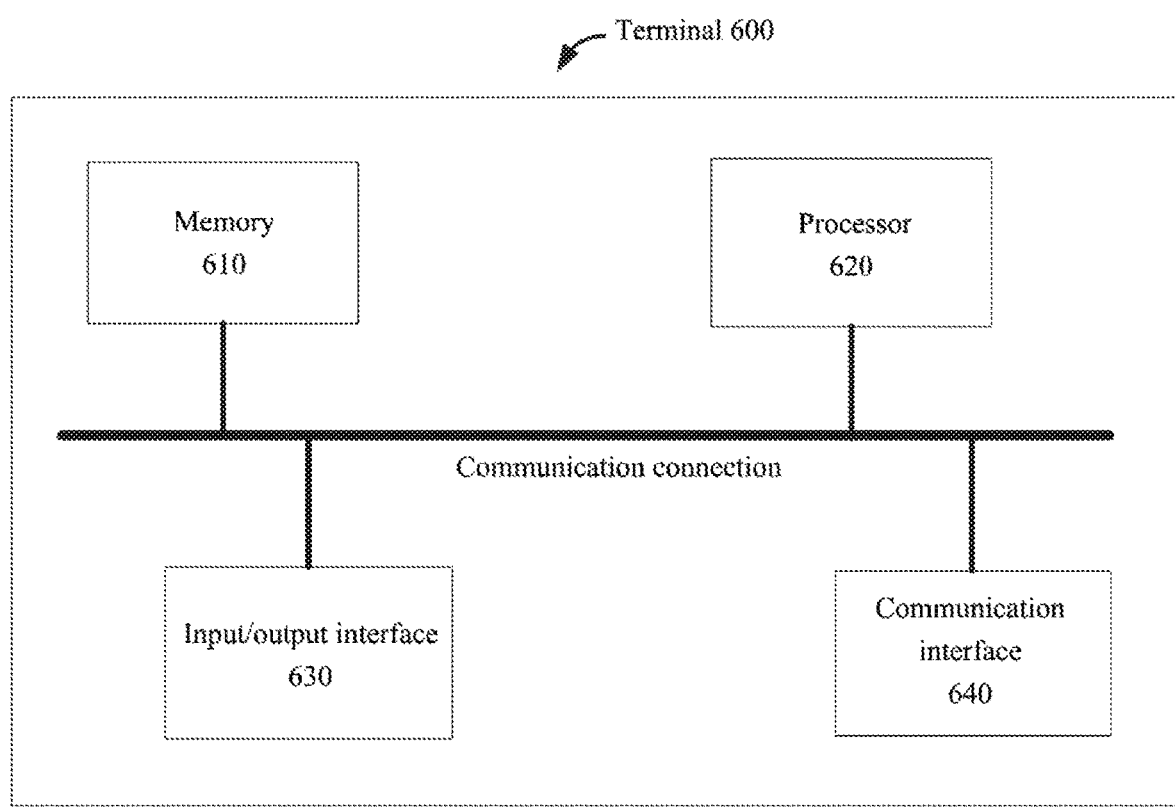
FIG. 6 is a schematic block diagram of a terminal according to another implementation of the present disclosure.

FIG. 6 is a schematic block diagram of a terminal according to another implementation of the present disclosure. The terminal 600 shown in FIG. 6 includes a memory 610, a processor 620, an input/output interface 630, and a communication interface 640. There are communication connections among the memory 610, the processor 620, the input/output interface 630, and the communication interface 640. The memory 610 is used for storing instructions. The processor 620 is used for executing the instructions stored in the memory 610 to control the input/output interface 630 to receive input data and information, to output data such as an operation result, and to control the communication interface 640 to send a signal.

The communication interface 640 is used for receiving first information sent by a network device, wherein the first information is used for indicating that a transmission pattern for transmitting a demodulation reference signal (DMRS) to be transmitted is a first transmission pattern or a second transmission pattern.

The communication interface 640 is further used for performing transmission of the DMRS to be transmitted with the network device on a transmission resource indicated by the first transmission pattern or the second transmission pattern.

It should be understood that in the implementation of the present disclosure, the processor 620 may adopt a general-purpose Central Processing Unit (CPU), a microprocessor, an Application Specific Integrated Circuit (ASIC), or one or more integrated circuits for executing related programs, to implement technical solutions provided by the implementation of the present disclosure.

It should also be understood that the communication interface 640 uses a transceiving apparatus such as, but not limited to, a transceiver to realize communication between the mobile terminal 600 and another device or a communication network.

The storage 610 may include a read-only memory and a random access memory, and provide instructions and data to the processor 620. A part of the processor 620 may include a non-volatile random access memory. For example, the processor 620 may store information about device types.

In an implementing process, acts of the methods may be accomplished by integrated logic circuits of hardware in the processor 620 or instructions in a form of software. The method for transmitting the reference signal disclosed in combination with the implementations of the present disclosure may be embodied to be directly implemented by a hardware processor, or by a combination of hardware and software modules in a processor. The software modules may be located in a storage medium commonly used in the art, such as a random access memory, a flash memory, a read-only memory, a programmable read-only memory, or an electrically erasable programmable memory, or a register. The storage medium is located in the memory 610, and the processor 620 reads information in the memory 610 and accomplishes the acts of the methods in combination with its hardware. In order to avoid repetition, it will not be described in detail here.

Optionally, as one implementation, the first transmission pattern is used for indicating that the DMRS to be transmitted contains an optional reference signal, and the second transmission pattern is used for indicating that the DMRS to be transmitted does not contain the optional reference signal.

Optionally, as one implementation, a quantity of transmission resources for transmitting the DMRS to be transmitted in a transmission unit indicated by the first transmission pattern is greater than a quantity of transmission resources used for transmitting the DMRS to be transmitted in a transmission unit indicated by the second transmission pattern.

Optionally, as one implementation, the communication interface is specifically used for receiving the first information sent by the network device, wherein a first field in the first information is used for indicating that the transmission pattern for transmitting the DMRS to be transmitted is the first transmission pattern or the second transmission pattern.

Optionally, as one implementation, the communication interface is specifically used for receiving the first information sent by the network device, wherein the first information indicates whether the transmission pattern for transmitting the DMRS to be transmitted is the first transmission pattern or the second transmission pattern through whether carrying a second field or not.

Optionally, as one implementation, the first information is any one piece of following information: system information, a Radio Resource Control (RRC) signaling, a Media Access Control (MAC) signaling, and Downlink Control Information (DCI), and/or the first information is carried in a broadcast message transmitted through a physical layer.

Optionally, as one implementation, the DMRS to be transmitted is used for demodulating a first channel, and the first channel is used for transmitting at least one piece of following information: a paging message and indication information, and the indication information is used for indicating contents of at least part of system information.

Figure 7:
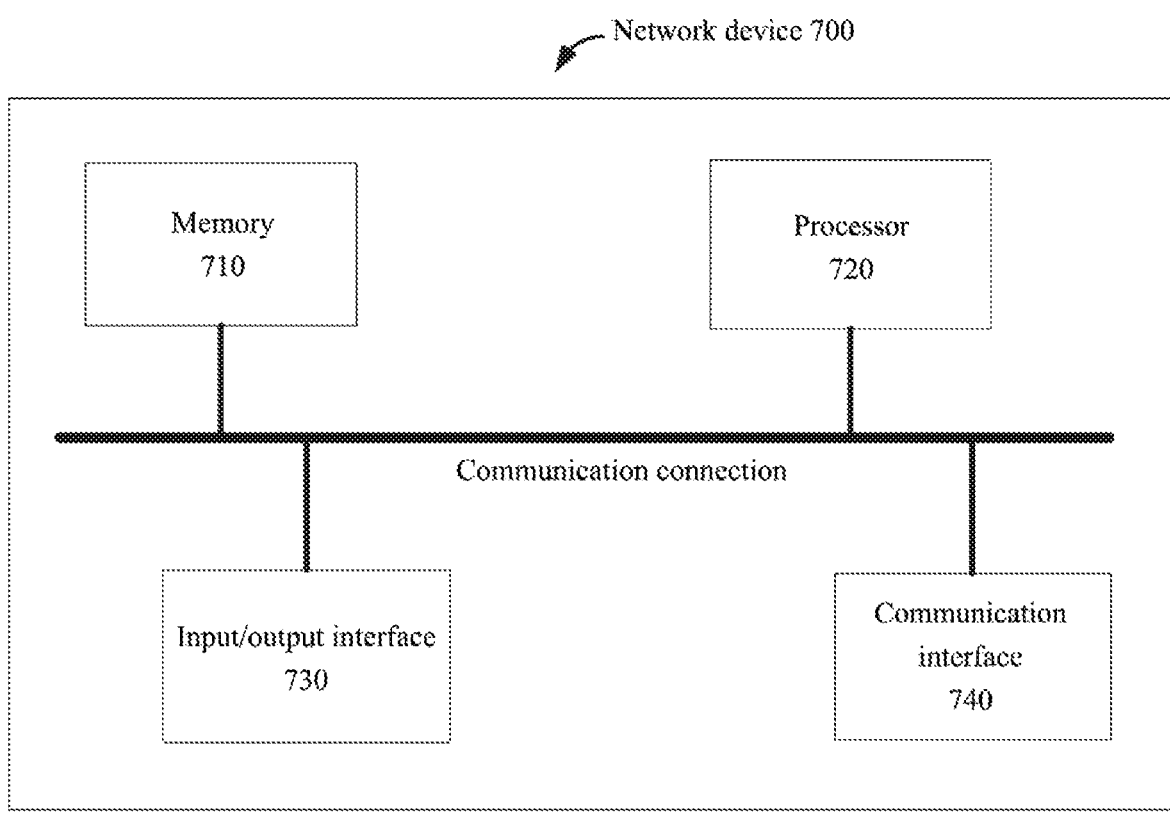
FIG. 7 is a schematic block diagram of a network device according to another implementation of the present disclosure.

FIG. 7 is a schematic block diagram of a network device according to another implementation of the present disclosure. The network device 700 shown in FIG. 7 includes a memory 710, a processor 720, an input/output interface 730, and a communication interface 740. There are communication connections among the memory 710, the processor 720, the input/output interface 730, and the communication interface 740. The memory 710 is used for storing instructions. The processor 720 is used for executing the instructions stored in the memory 710 to control the input/output interface 730 to receive input data and information, to output data such as an operation results, and to control the communication interface 740 to send a signal.

The communication interface 740 is used for sending first information to a terminal, wherein the first information is used for indicating that a transmission pattern for transmitting a demodulation reference signal (DMRS) to be transmitted is a first transmission pattern or a second transmission pattern.

The communication interface 740 is further used for transmitting the DMRS to be transmitted to the terminal on a transmission resource indicated by the first transmission pattern or the second transmission pattern.

It should be understood that in the implementation of the present disclosure, the processor 720 may adopt a general-purpose Central Processing Unit (CPU), a microprocessor, an Application Specific Integrated Circuit (ASIC), or one or more integrated circuits for executing related programs, to implement technical solutions provided by the implementation of the present disclosure.

It should also be understood that the communication interface 740 uses a transceiving device such as, but not limited to, a transceiver to realize communication between the mobile terminal 700 and another device or a communication network.

The storage 710 may include a read-only memory and a random access memory, and provide instructions and data to the processor 720. A part of the processor 720 may include a non-volatile random access memory. For example, the processor 720 may store information about device types.

In an implementing process, acts of the methods may be accomplished by integrated logic circuits of hardware in the processor 720 or instructions in a form of software. The method for transmitting the reference signal disclosed in combination with the implementations of the present disclosure may be embodied to be directly implemented by a hardware processor, or by a combination of hardware and software modules in a processor. The software modules may be located in a storage medium commonly used in the art, such as a random access memory, a flash memory, a read-only memory, a programmable read-only memory, or an electrically erasable programmable memory, or a register. The storage medium is located in the memory 710, and the processor 720 reads information in the memory 710 and accomplishes the acts of the methods in combination with its hardware. In order to avoid repetition, it will not be described in detail here.

Optionally, as one implementation, the first transmission pattern is used for indicating that the DMRS to be transmitted contains an optional reference signal, and the second transmission pattern is used for indicating that the DMRS to be transmitted does not contain the optional reference signal.

Optionally, as one implementation, a quantity of transmission resources for transmitting the DMRS to be transmitted in a transmission unit indicated by the first transmission pattern is greater than a quantity of transmission resources used for transmitting the DMRS to be transmitted in a transmission unit indicated by the second transmission pattern.

Optionally, as one implementation, the communication interface is specifically used for sending the first information to the terminal, wherein a first field in the first information is used for indicating that the transmission pattern for transmitting the DMRS to be transmitted is the first transmission pattern or the second transmission pattern.

Optionally, as one implementation, the communication interface is specifically used for sending the first information to the terminal, wherein the first information indicates whether the transmission pattern for transmitting the DMRS to be transmitted is the first transmission pattern or the second transmission pattern through whether carrying a second field or not.

Optionally, as one implementation, the input/output interface is used for acquiring communication state information of the terminal; the processor is used for determining the transmission pattern for transmitting the DMRS to be transmitted as the first transmission pattern or the second transmission pattern according to the communication state information.

Optionally, as one implementation, the first information is any one piece of following information: system information, a Radio Resource Control (RRC) signaling, a Media Access Control (MAC) signaling, and Downlink Control Information (DCI), and/or the first information is carried in a broadcast message transmitted through a physical layer.

Optionally, as one implementation, the DMRS to be transmitted is used for demodulating a first channel, and the first channel is used for transmitting at least one piece of following information: a paging message and indication information, and the indication information is used for indicating contents of at least part of system information.

It should be understood that in the implementations of the present disclosure, "B corresponding to A" means that B is associated with A, and B may be determined according to A. However, it should be further understood that determining B according to A does not mean B is determined according to A only, but B may be determined according to A and/or other information.

The term "and/or" in this document is merely an association relationship describing associated objects, indicating that there may be three relationships, for example, A and/or B may indicate three situations: A alone, A and B, and B alone. In addition, the symbol "/" in this document generally indicates that objects before and after the symbol "/" have an "or" relationship.

It should be understood that in various implementations of the present disclosure, sequence numbers of the various processes do not imply an order of execution of the various processes, which should be determined by their functions and internal logics, and should not constitute any limitation on implementation processes of the implementations of the present disclosure.

In several implementations provided by the present disclosure, it should be understood that the disclosed systems, apparatuses and methods may be implemented in other ways. The apparatus implementations are only illustrative, for example, division of the units is only a logical function division, and there may be other division manners in actual realization. For example, multiple units or components may be combined or integrated into another system, or some features may be ignored or not executed. On the other hand, the mutual coupling or direct coupling or communication connection shown or discussed may be indirect coupling or communication connection through some interfaces, apparatuses or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the implementations.

In addition, various functional units in various implementations of the present disclosure may be integrated in one processing unit, or various units may be physically present separately, or two or more units may be integrated in one unit.

The implementations may be implemented in whole or in parts by software, hardware, firmware, or any combination thereof. When the functions described in the implementations of the present disclosure are implemented through software, these functions may be implemented in whole or in parts in a form of a computer program product. The computer program product includes one or more computer instructions. When the computer program instructions are loaded and executed on a computer, the processes or functions are generated in whole or in parts according to the implementations of the present disclosure. The computer may be a general purpose computer, a special purpose computer, a computer network, or another programmable apparatus. The computer instructions may be stored in a computer-readable storage medium, or transmitted from one computer-readable storage medium to another computer-readable storage medium, for example, the computer instructions may be transmitted from a website site, a computer, a server, or a data center to another website site, computer, server, or data center through a wired mode (e.g., a coaxial cable, an optical fiber, a Digital Subscriber Line (DSL)) or a wireless mode (e.g., infrared radiation, radio, microwave, etc.). The computer-readable storage medium may be any available medium that the computer can read, or a data storage device such as an integrated server or data center that includes one or more available media. The available medium may be a magnetic medium (e.g., a floppy disk, a hard disk, a magnetic tape), an optical medium (e.g., a Digital Video Disc (DVD)), or a semiconductor medium (e.g., a Solid State Disk (SSD)), or the like.

The foregoing are merely example implementations of the present disclosure, but the protection scope of the present disclosure is not limited thereto. Any person skilled in the art may easily conceive variations or substitutions within the technical scope disclosed by the present disclosure, which should be included within the protection scope of the present disclosure. Therefore, the protection scope of the present disclosure shall be determined by the protection scope of the claims.

What we claim is:

1. A method for transmitting a reference signal, comprising:
    receiving, by a terminal, first information sent by a network device, wherein the first information is used for indicating that a transmission pattern for transmitting a demodulation reference signal (DMRS) to be transmitted is a first transmission pattern or a second transmission pattern; and
    performing, by the terminal, transmission of the DMRS to be transmitted with the network device on a transmission resource indicated by the first transmission pattern or the second transmission pattern;
    wherein
    the first information indicates whether the transmission pattern for transmitting the DMRS to be transmitted is the first transmission pattern or the second transmission pattern through whether carrying a second field or not; and
    wherein a quantity of transmission resources used for transmitting the DMRS to be transmitted in a transmission unit indicated by the first transmission pattern is greater than a quantity of transmission resources used for transmitting the DMRS to be transmitted in a transmission unit indicated by the second transmission pattern.

2. The method according to claim 1, wherein a first field in the first information is used for indicating that the transmission resource pattern for transmitting the DMRS to be transmitted is the first transmission pattern or the second transmission pattern.

3. The method according to claim 1, wherein the first information is at least one piece of following information: system information, a radio resource control (RRC) signaling, a media access control (MAC) signaling, and downlink control information (DCI), or
    the first information is carried in a broadcast message transmitted through a physical layer.

4. A method for transmitting a reference signal, comprising:
    sending, by a network device, first information to a terminal, wherein the first information is used for indicating that a transmission pattern for transmitting a demodulation reference signal (DMRS) to be transmitted is a first transmission pattern or a second transmission pattern; and
    sending, by the network device, the DMRS to be transmitted to the terminal on a transmission resource indicated by the first transmission pattern or the second transmission pattern;
    wherein
    the first information indicates whether the transmission pattern for transmitting the DMRS to be transmitted is the first transmission pattern or the second transmission pattern through whether carrying a second field or not; and
    wherein a quantity of transmission resources for transmitting the DMRS to be transmitted in a transmission unit indicated by the first transmission pattern is greater than a quantity of transmission resources used for transmitting the DMRS to be transmitted in a transmission unit indicated by the second transmission pattern.

5. The method according to claim 4, wherein a first field in the first information is used for indicating the transmission pattern for transmitting the DMRS to be transmitted the first transmission pattern the second transmission pattern.

6. The method according to claim 4, wherein the first information is any one piece of following information: system information, a radio resource control (RRC) signaling, a media access control (MAC) signaling, and downlink control information (DCI), or
    the information is carried in a broadcast message transmitted through a physical layer.

7. A terminal, comprising a communication interface, wherein,
    the communication interface is used for receiving first information sent by a network device, wherein the first information is used for indicating that a transmission pattern for transmitting a demodulation reference signal (DMRS) to be transmitted is a first transmission pattern or a second transmission pattern;
    the communication interface is further used for performing transmission of the DMRS to be transmitted with the network device on a transmission resource indicated by the first transmission pattern or the second transmission pattern;
    the first information indicates whether the transmission pattern for transmitting the DMRS to be transmitted is the first transmission pattern or the second transmission pattern through whether carrying a second field or not; and
    a quantity of transmission resources used for transmitting the DMRS to be transmitted in a transmission unit indicated by the first transmission pattern is greater than a quantity of transmission resources used for transmitting the DMRS to be transmitted in a transmission unit indicated by the second transmission pattern.

8. The terminal according to claim 7, wherein a first field in the first information is used for indicating that the transmission pattern for transmitting the DMRS is the first transmission pattern or the second transmission pattern.

9. The terminal according to claim 7, wherein the first information is any one piece of following information: system information, a radio resource control (RRC) signaling, a media access control (MAC) signaling, and downlink control information (DCI), or the first information is carried in a broadcast message transmitted through a physical layer.

10. A network device, comprising a communication interface, wherein, the communication interface is used for sending first information to a terminal, wherein the first information is used for indicating that a transmission pattern for transmitting a demodulation reference signal (DMRS) to be transmitted is a first transmission pattern or a second transmission pattern;

the communication interface is further used for transmitting the DMRS to be transmitted to the terminal on a transmission resource indicated by the first transmission pattern or the second transmission pattern; and the first information indicates whether the transmission pattern for transmitting the DMRS to be transmitted is the first transmission pattern or the second transmission pattern through whether carrying a second field or not; and a quantity of transmission resources for transmitting the DMRS to be transmitted in a communication interface indicated by the first transmission pattern is greater than a quantity of transmission resources used for transmitting the DMRS to be transmitted in a communication interface indicated by the second transmission pattern.

11. The network device according to claim 10, wherein a first field in the first information is used for indicating the transmission for transmitting the DMRS to be transmitted the first transmission pattern or the second transmission pattern.

12. The network device according to claim 10, wherein the first information is any one piece of following information: system information, a radio resource control (RRC) signaling, a media access control (MAC) signaling, and downlink control information (DCI), or first information is carried in a broadcast message transmitted through a physical layer.

* * * * *